US012785801B2

(12) United States Patent
A et al.

(10) Patent No.: US 12,785,801 B2
(45) Date of Patent: Nov. 3, 2026

(54) PERFORMANCE MONITORING OF AN OPTICAL NETWORK UNIT

(71) Applicant: Nokia Solutions and Networks Oy, Espoo (FI)

(72) Inventors: Srinivasan A, Chennai (IN); Naga Satish Uda, Bhimavaram (IN); Sajeesh T, Kochi (IN); Xavier John Prabakaran, Chennai (IN)

(73) Assignee: Nokia Solutions and Networks Oy, Espoo (FI)

( * ) Notice: Subject to any disclaimer, the term of this patent is extended or adjusted under 35 U.S.C. 154(b) by 634 days.

(21) Appl. No.: 18/335,530

(22) Filed: Jun. 15, 2023

(65) Prior Publication Data

US 2023/0412268 A1 Dec. 21, 2023

(30) Foreign Application Priority Data

Jun. 17, 2022 (IN) ............................ 202241034976

(51) Int. Cl.
*H04B 10/079* (2013.01)

(52) U.S. Cl.
CPC ................................ *H04B 10/0795* (2013.01)

(58) Field of Classification Search
CPC .................................................. H04B 10/0795
See application file for complete search history.

(56) References Cited

U.S. PATENT DOCUMENTS 9,020,921 B2 4/2015 Alber et al.
9,715,380 B2 7/2017 Ramachandran et al.
11,252,035 B2 2/2022 Wang et al.
2005/0185631 A1 8/2005 Bernard et al.
2019/0319709 A1 10/2019 Zheng et al.
2024/0007352 A1* 1/2024 Magaldi ................ H04B 10/27

FOREIGN PATENT DOCUMENTS

WO 2017/184860 A1 10/2017

OTHER PUBLICATIONS

"ONU management and control interface (OMCI) specification", Series G: Transmission systems and media, digital systems and networks, Recommendation ITU-T G.988, Nov. 2022, 706 pages.
"Broadcom Ethernet Network Adapter User Guide", Broadcom, Retrieved on Jul. 12, 2023, Webpage available at : https://techdocs.broadcom.com/us/en/storage-and-ethernet-connectivity/ethernet-nic-controllers/bcm957xxx/adapters/statistics/counters.html.

(Continued)

*Primary Examiner* — David C Payne
(74) *Attorney, Agent, or Firm* — Harness, Dickey & Pierce, P.L.C.

(57) ABSTRACT

Techniques for performance monitoring in an Optical Network Unit (ONU) associated with an ONU management module are described. In one aspect, a request to selectively enable one or more performance counter groups from a plurality of counter groups associated with an interface of the ONU is received. Accordingly, the request to selectively enable one or more performance counter groups is sent by the ONU management module to the corresponding ONU and performance monitoring data are collected from selected one or more performance counter groups enabled from the plurality of counter groups.

15 Claims, 4 Drawing Sheets

(56) References Cited

OTHER PUBLICATIONS

"Lightspan FX fiber access nodes", Nokia, Retrieved on Jul. 12, 2023, Webpage available at : https://www.nokia.com/networks/fixed-networks/lightspan-fx/.
Velasco et al., "Monitoring and Data Analytics for Optical Networking: Benefits, Architectures, and Use Cases", IEEE Network, vol. 33, No. 6, Nov.-Dec. 2019, pp. 100-108.
Moniz et al., "Multi-Layer Network Optimization Efficiently Exploiting Real-Time Performance Monitoring", IEEE Global Communications Conference (GLOBECOM), Dec. 9-13, 2019, 6 pages.
Extended European Search Report received for corresponding European Patent Application No. 23165069.8, dated Nov. 10, 2023, 11 pages.
"ONU management and control interface (OMCI) specification Amendment 5", Series G: Transmission systems and media, digital systems and networks, Digital sections and digital line system—Optical line systems for local and access networks, ITU-T Recommendation G.988, Amendment 5, Jun. 2022, 692 pages.

* cited by examiner

300

PERFORMANCE MONITORING OF AN OPTICAL NETWORK UNIT

TECHNICAL FIELD

The present subject matter relates, in general, to performance monitoring of an Optical Network Unit, and in particular, to selectively enable performance counter groups in Optical Network Units.

BACKGROUND

Passive Optical Networks (PON) is a fiber optic technology for data transmission between service providers and an end consumer. Passive optical networks are a single point to multi point access networks. Generally, the network architecture of a passive optical network includes an Optical Line Terminal (OLT), a passive optical splitter, and multiple Optical Network Units (ONUs). An OLT is provided at a service providers end that communicates with multiple ONUs that are associated with multiple user equipment accessed by the end users.

SUMMARY

Aspects of the present subject matter provide techniques for selectively enabling performance counter groups in Optical Network Units to facilitate improved performance monitoring of ONUs with reduced impact on CPU performance and memory usage in ONU management.

According to an example of the present subject matter, a method for performance monitoring in an Optical Network Unit (ONU) associated with an ONU management module is provided. The method comprises, receiving a request to selectively enable one or more performance counter groups from a plurality of counter groups associated with an interface of the ONU, sending the request to selectively enable the one or more performance counter groups from the plurality of counter groups associated with the interface of the ONU, and collecting performance monitoring data from selected one or more performance counter groups that are enabled from the plurality of counter groups.

According to another example of the present subject matter, a system for performance monitoring in an Optical Network Unit (ONU) associated with an ONU management module is provided. The system includes a processor and a memory. Further, the system includes an ONU management module executable by the processor, which is configured to receive a request to selectively enable one or more performance counter groups from a plurality of counter groups associated with an interface of the ONU, send the request to selectively enable the one or more performance counter groups from the plurality of counter groups associated with the interface of the ONU, and collect performance monitoring data from selected one or more performance counter groups that are enabled from the plurality of counter groups.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
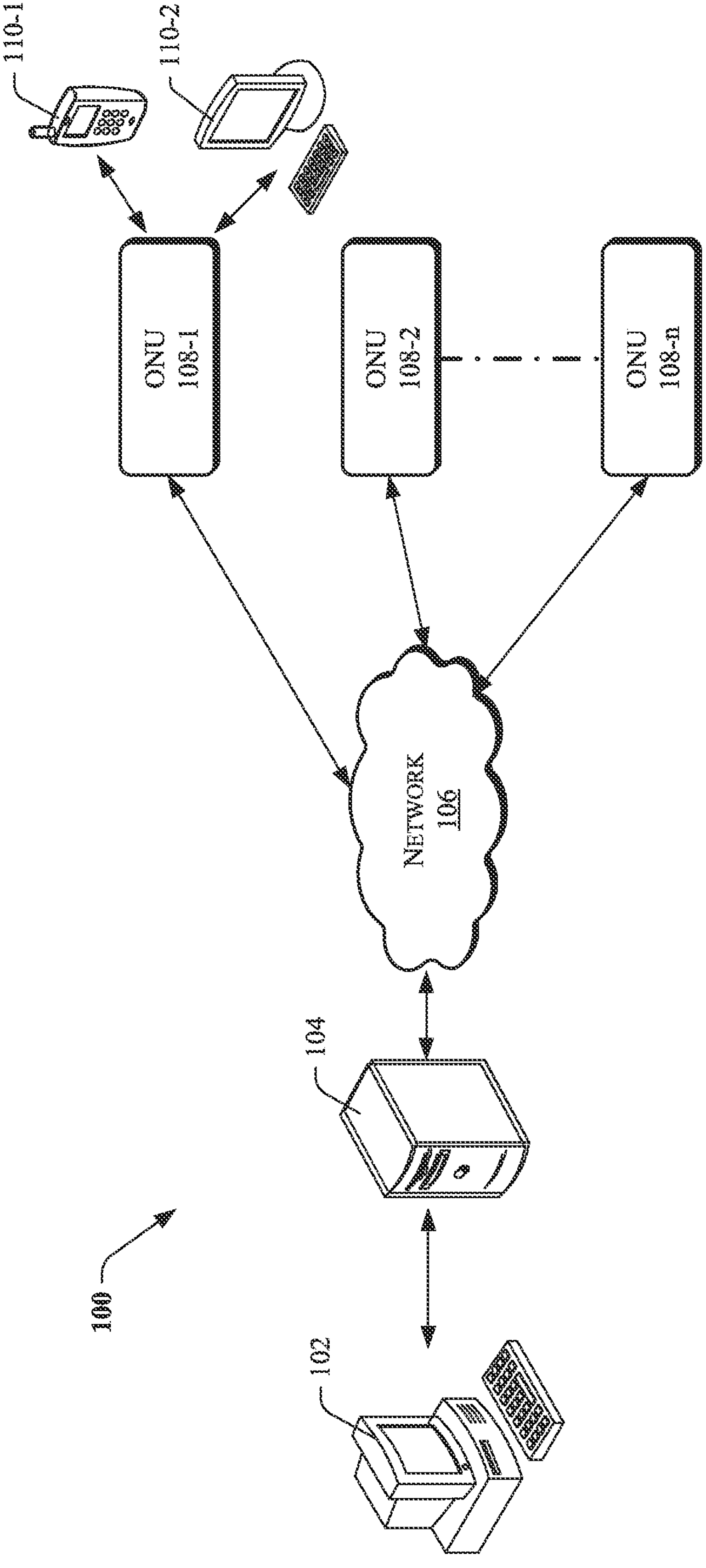
FIG. 1 illustrates an optical distribution network environment, in accordance with an example implementation of the present subject matter.

The present subject matter relates to performance monitoring of an Optical Network Unit, specifically to selectively enable one or more performance counter groups in Optical Network Units (ONUs) to achieve reduced memory usage and impact on the CPU utilization, thereby improving the performance in management of the ONUs.

Conventional techniques employed in performance monitoring of an Optical Network Unit (ONU) connected in a passive optical network, such as an xPON network, includes an ONU management module configured to enable performance monitoring in the ONU. Generally, the performance monitoring in the ONU is performed by sending an ONU Management and Control Interface (OMCI) message from the ONU management module to the ONU.

In one technique, there are multiple performance monitoring Management Entities (MEs) that may be created in the ONU to collect performance monitoring data from the various performance counters of an interface associated with the ONU. The performance monitoring data may be periodically collected after a set time interval, for example, every 15 mins. When performance monitoring is enabled in the ONU, all the available performance counters (in hundreds) in the ONU are collected by the ONU management module, which are subsequently provided to an operator requesting performance monitoring data, through a NETCONF client. For example, if the performance counters of an ANI interface of a single ONU is enabled, 9 MEs may be created, and performance counters from these 9 MEs may be collected every 15 minutes. Further, in a scaled environment, when the ONU management module is managing around two thousand ONUs, then in such a scenario, on enabling the ANI interface in two thousand ONUs, eighteen thousand MEs will be created and executed every 15 mins. This results in excessive CPU utilization and memory usage in the ONU management module.

Further, when performance monitoring is enabled in the ONU for an interface, performance monitoring data from all performance counter associated with the said interface of the ONU are collected and provided to the operator requesting performance monitoring data. Even in a scenario where the operator requesting performance monitoring data is interested only in a certain set of performance counters associated with the said interface, for which performance monitoring is enabled, the operator is provided with all the performance counters associated with the said interface. For example, the operator might be interested only in the PHY counters in an Access Network Interface (ANI). However, when performance is enabled at the ANI interface, all counters associated with the ANI interface are enabled. Also, as all counters associated with an interface are enabled by default, in a scenario where certain performance monitoring MEs are not supported by the said interface are enabled, the ONU creates unsupported MEs, resulting in an OMCI error. These errors could further affect the performance monitoring for the other MEs that are created and result in deteriorating the overall functionality of the ONUs.

Accordingly, the present subject matter provides techniques of performance monitoring data grouped into logical counter groups, so that in addition to the performance enable option, the operator may selectively enable the performance counter groups that required. The performance counter groups may be logically grouped based on the state YANG tree of the performance data. Therefore, providing a clear idea to the operator to know which performance counter group should be enabled or disabled to collect the required performance monitoring data.

In operation, the method for performance monitoring in an ONU associated with an ONU management module, where a request to selectively enable one or more performance counter groups from a plurality of counter groups associated with an interface of the ONU is received. The request to selectively enable one or more performance counter groups from the plurality of counter groups associated with the interface of the ONU is sent to an ONU, and performance monitoring data is collected from selected one or more performance counter groups that are enabled from the plurality of counter groups.

Therefore, the present subject matter provides a method, where the operator can selectively enable the performance counter groups based on the need or a deployment scenario, thereby controlling the impact on CPU and memory usage in ONU management module, and improving performance associated with management of the ONUs.

The above and other features, aspects, and advantages of the subject matter will be better explained with regards to the following description and accompanying figures. It should be noted that the description and figures merely illustrate the principles of the present subject matter along with examples described herein and should not be construed as a limitation to the present subject matter. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

FIG. 1 illustrates an optical network environment 100, in accordance with an example implementation of the present subject matter. In one example, the optical network environment 100 may be a passive optical network environment, such as xPON, where the optical network environment 100 includes a Network Configuration (NETCONF) client 102, an Optical Line Terminal (OLT) 104, an Optical Distribution Network (ODN) 106, alternatively referred to as network 106, and a plurality of Optical Network Units (ONUs) 108-1, 108-2, . . . **108-*n*, collectively and alternatively referred to as ONU 108**.

The OLT 104 may be coupled to the ONUs 108 through the ODN 106. The OLT 104 may be provided at the service providers end and the ONU 108 may be provided at the consumer end. In one example, each ONU 108-1, 108-2, . . . **108-*n*, may be coupled to a plurality of user equipments 110-1, 110-2, collectively referred to as user equipment (UE) 110. In one example, a single line card of an OLT 104 may be coupled to multiple ONUs 108. As an example, the figure depicts a single ONU 108-1 coupled to two user equipments 110-1 and 110-2. Similarly, each ONU 108 may be coupled to multiple user equipments 110. The user equipment 110** may be any one of a mobile device, a laptop, a computer, a telephone, and the like.

It would be understood that the ONUs 108, the OLT 104 and the user equipments 110 may be communicatively coupled to each other either through a direct communication link, or through multiple communication links of a communication network (not shown). The communication network may be a wireless or a wired network, or a combination thereof. The communication network can be a collection of individual networks, interconnected with each other and functioning as a single large network. Examples of such individual networks include, but are not limited to, Global System for Mobile communication (GSM) network, Universal Mobile Telecommunications System (UMTS) network, Long Term Evolution (LTE) network, personal communications service (PCS) network, Time-division multiple access (TDMA) network, Code-Division Multiple Access (CDMA) network, next-generation network (NGN), public switched telephone network (PSTN), and Integrated Services Digital Network (ISDN). Depending on the terminology, the communication network includes various network entities, such as gateways and routers; however, such details have been omitted to maintain the brevity of the description.

For the sake of simplicity, the following description has been discussed with reference to a single ONU 108-1 communicatively coupled to the OLT 104. However, similar principles may be applicable to all ONUs 108 coupled to the OLT 104. In one example, the ONU 108-1 may be associated with the OLT 104 and the UEs 110 through an interface (not shown in the figure). The interface may be a physical interface or a logical interface. The interface of the ONU 108-1 may be one or more of an Access Network Interface (ANI), a User Network Interface (UNI), a Plain Old Telephone Service (POTS), a Gigabit-capable Passive Optic Network Encapsulation Method (GEM) port, a Physical Path Termination Point (PPTP), and the like. The ONU 108-1 may be coupled to the OLT 104 through one interface and to the user equipment 110 through another interface. For example, the ONU 108-1 may be communicatively coupled to the OLT 104 through the Access Network Interface (ANI) and may be coupled to the user equipment 110-1 through the User Network Interface (UNI), and the like.

In one example, the OLT 104 may be controlled by a Network Configuration (NETCONF) protocol, received from the NETCONF client 102. In one example, an operator (not shown in the figure), alternatively referred to as a user, may request the OLT 104 to selectively enable performance monitoring of an interface associated with the ONU 108. The operator may request to monitor the performance monitoring data of an interface in one or more ONUs 108 coupled to the OLT 104. On receiving the request from the NETCONF client 102, an ONU management module (not shown in the figure) of the OLT 104 may establish a communication link with the corresponding ONU 108 through an OMCI message. Based on the request, one or more performance counter groups from the plurality of counter groups associated with the interface of the ONU 108 may be selectively enabled or disabled. Based on the performance counter groups that are selectively enabled or disabled, the OLT 104 periodically receives performance monitoring data from the ONU 108, which are subsequently provided to the operator through the NETCONF client 102.

Therefore, techniques of the present subject matter facilitate the operator to request performance monitoring data corresponding to specific performance counter groups of the interface associated with an ONU. As the operator, can control the performance counter groups that are to be enabled or disabled based on the need and a deployment scenario, techniques of the present subject matter provide improved performance monitoring of ONUs with reduced memory usage and CPU utilization. A system including the OLT 104 and the ONU 108, and the call flow for performance monitoring in an Optical Network Unit (ONU) associated with an ONU management module is discussed in detail with reference to FIG. 2 and FIG. 3, respectively.

Figure 2:
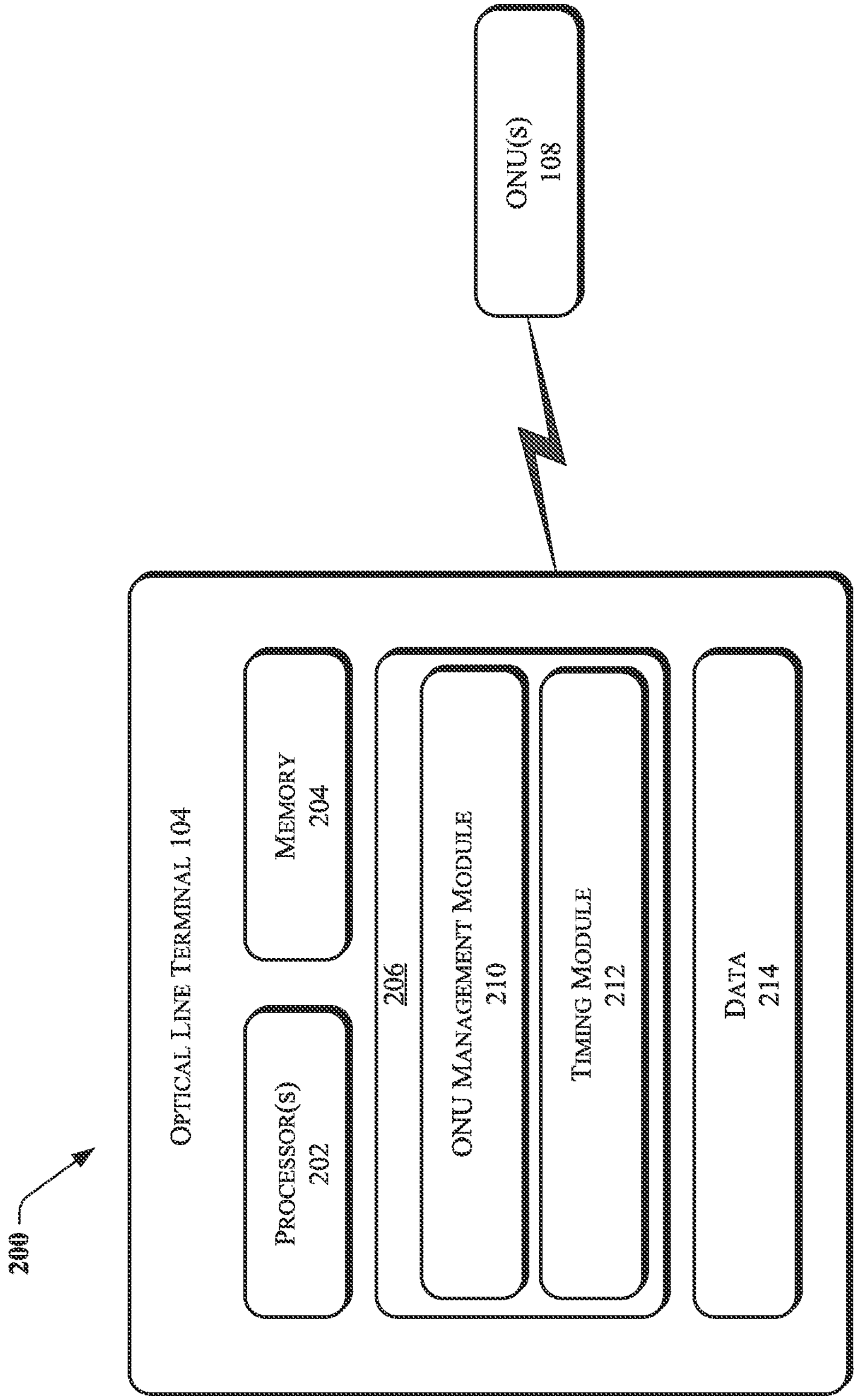
FIG. 2 illustrates a system including an optical line terminal communicatively coupled to an optical network unit, in accordance with an example implementation of the present subject matter.

FIG. 2 illustrates a system 200 including an optical line terminal OLT 104 communicatively coupled to an optical network unit ONU 108, in accordance with an example implementation of the present subject matter. In one example, the system 200 may include an OLT 104 that may be communicatively coupled to the ONU 108. In another example, the system 200 may include another server or cloud (not shown in the figure) that may be communicatively coupled to the ONU 108.

In one example, the OLT 104 may include a processor 202 and a memory 204 coupled to the processor 202. The functions of functional block labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, standard and/or custom, may also be included.

The memory 204 may include any computer-readable medium including, for example, volatile memory (e.g., RAM), and/or non-volatile memory (e.g., EPROM, flash memory, etc.).

The OLT 104 may further include modules 206, such as an ONU management module 210, and a timing module 212. In one example, the modules 206 may be implemented as a combination of hardware and firmware. In examples described herein, such combinations of hardware and firmware may be implemented in several different ways. For example, the firmware for the module may be processor executable instructions stored on a non-transitory machine-readable storage medium and the hardware for the module may include a processing resource (for example, implemented as either a single processor or a combination of multiple processors), to execute such instructions.

In the present examples, the machine-readable storage medium may store instructions that, when executed by the processing resource, implement the functionalities of the module. In such examples, the OLT 104 may include the machine-readable storage medium storing the instructions and the processing resource to execute the instructions. In other examples of the present subject matter, the machine-readable storage medium may be located at a different location but accessible to the OLT 104 and the processor 202.

The OLT 104 may further include data 214, that serves, amongst other things, as a repository for storing data that may be fetched, processed, received, or generated by the ONU management module 210 and the timing module 212. The data 214 may include communication data, performance management monitoring data, timing data, and the like. In an example, the data 214 may be stored in the memory 204.

In one example, the ONU management module 210 may be configured to receive a request to selectively enable one or more performance counter groups from a plurality of counter groups associated with an interface of the ONU 108. In another example, the ONU management module 210 may be configured to receive a request to disable one or more performance counter groups from a plurality of counter groups associated with an interface of the ONU 108. In one example, the ONU management module 210 may be a part of the OLT 104. In another example, the ONU management module 210 may be part of another server, and the like.

The ONU management module 210 may be configured to receive a request to selectively enable performance monitoring in a plurality of physical interfaces in the ONU 108, such as ANI, UNI, POTS UNI, and logical interfaces in the ONU 108, such as GEM port, SIP agent, and the like. Each interface has a plurality of performance counters, where the plurality of performance counters may be grouped logically. In one example, the performance counters may be logically grouped based on a state YANG tree of the performance data. Logically grouping the performance counters of an interface based on a state YANG tree of the performance data, facilitates an operator to know which performance counter group may be enabled or disabled, and subsequently collect the required performance monitoring data for performance monitoring. It would be understood to a person skilled in the art that although in this example, principles of the present subject matter have been explained with respect to a YANG protocol, similar principles may be applicable to other communication protocols as well.

In one example, a control knob may be added to a YANG data model, by the addition of a YANG leaf-list, by methods known in the art, to selectively enable or disable a specific performance counter group of the interface, in addition to enabling the performance of the interface for which performance monitoring data may be requested.

In one example, the ONU management module 210 may be configured to receive a request through the NETCONF client 102, where the NETCONF client 102 may generate a protocol based on the operator's request. In one example, the performance monitoring may be performed for a specific ONU 108 of the plurality of ONUs 108 associated with the OLT 104. In another example, the performance monitoring may be performed for a group of ONUs 108 coupled to the OLT 104.

On receiving the request, the ONU management module 210 may send an ONU Management and Control Interface (OMCI) message to the corresponding ONU 108 to selectively enable the one or more performance counter groups from the plurality of counter groups associated with the interface of the ONU 108. In one example, selectively enabling the one or more performance counter groups from the plurality of counter groups associated with the interface may include any one of, but not limited to, requesting the ONU to enable one or more groups of performance counter groups from the plurality of counter groups, requesting the ONU to disable one or more groups of performance counter groups from the plurality of counter groups, or requesting the ONU to enable one or more groups of performance counter groups and disable one or more groups of performance counter groups from the plurality of counter groups, and the like.

For example, when an ANI interface of a specific ONU of interest is enabled, the performance counter groups associated with the ANI interface may be phy counters, lods counters, gemport counters, utilization counters, ploam counters, activation counters, tuning control counters, power levelling counters, omci counters, power-monitoring counters, and the like. In one example, to selectively enable one or more counter groups of the plurality of counter groups, the operator may request the ONU to enable phy counters and lods counters. In another example, to selectively enable one or more counter groups of the plurality of counter groups, the operator may request the ONU to disable the phy counters, lods counters, gemport counters, utilization counters. In another example, to selectively enable one or more counter groups of the plurality of counter groups, the operator may request the ONU to enable the phy counters, lods counters, and disable the gemport counters, utilization counters, and the like.

On selectively enabling the one or more performance counter groups, the ONU management module 210 may collect performance monitoring data from the selected one or more performance counter groups that are enabled, from the plurality of counter groups, periodically. In one example, performance monitoring data may be collected from performance Management Entities that may be created based on the performance counter groups that are enabled, explained in detail with reference to FIG. 3.

In one example, the timing module 212 of the OLT 104 may be configured to trigger the ONU management module 210 to collect performance monitoring data from the one or more performance counter groups that are enabled, after a predetermined time interval. For example, the predetermined time interval may be fifteen minutes, or twenty-four hours, and the like. This may result in the ONU management module 210 collecting performance monitoring data from selected one or more performance counter groups that are enabled from the plurality of counter groups periodically, based on the predetermined time interval that is set. The performance monitoring data, i.e., the data 214 collected periodically may be stored in the memory 204 of the OLT 104. Further, when the operator requests the performance monitoring data for specific performance counter groups, the ONU management module 210 sends the performance monitoring data to the operator through the NETCONF client.

The following example is only to elucidate selectively enabling one or more performance counter groups of an interface and is not to be construed as a limitation. In the following example, selectively enabling one or more performance counter groups of an ANI interface of the ONU 108 is considered. In one example, a YANG tree from a The Broadband Forum (BBF) standard, such as—bbf-xpon-performance-management.yang is considered. The YANG tree lists the various xPON performance counters that can be collected under the ANI interface, such as phy counters, lods counters, gemport counters, utilization counters, ploam counters, activation counters, tuning control counters, power levelling counters, omci counters, power-monitoring counters, and the like. Each of these counters may have a plurality of parameters that may be monitored. For example, but not limited to, the phy counter group may include parameters, such as corrected-fec-bytes, corrected-fec-codewords, uncorrectable-fec-codewords, and the like.

As discussed, in the YANG tree, there are various performance counters available under the ANI interface, and the number of performance counters may increase based on additional support. However, an operator may be interested to monitor only a specific set of counters. For example, the operator may want to monitor only the PHY counters. Accordingly, the operator may request the ONU management module through the NETCONF client, to not only enable the performance of the ANI interface, but also enable the PHY counter group associated with the ANI interface. The ONU management module receives performance monitoring data from the PHY counter group periodically. For example, the ONU management module may receive the performance monitoring data from the PHY counter group every 15 minutes. The performance monitoring data collected periodically from the PHY counter group may be stored as data 214 in the memory 204 of the OLT 104. Further, on receiving a request from the operator, the ONU management module 210 may send the performance monitoring data stored in the memory 204 of the OLT 104 to the operator through the NETCONF client.

Therefore, the present subject matter facilitates an operator to selectively enable or disable one or more performance counter groups based on the requirement. This results in reducing the memory usage and CPU utilization by the ONU management module, thereby improving the performance monitoring. Additionally, as the operator can selectively enable one or more performance counter groups, in a scenario where a specific set of counters are not supported by the interface enabled, the operator may disable the unsupported counter groups, thereby eliminating the OMCI error that may be returned by the ONU device. Similarly, one or more counter groups may be disabled for other interface types such as UNI, POTS UNI, GEM port, and the like.

Figure 3:
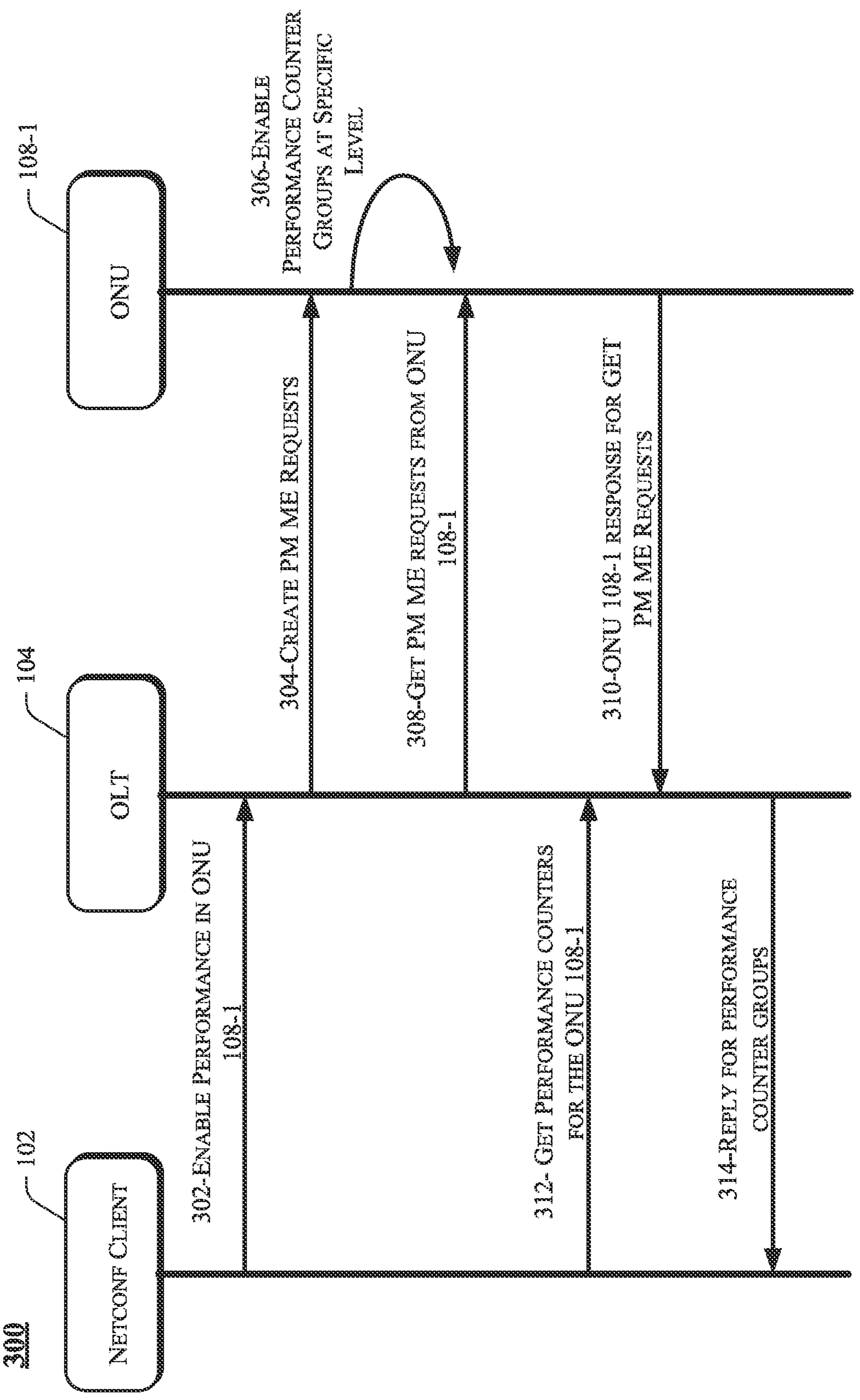
FIG. 3 illustrates a call flow for performance monitoring in an Optical Network Unit (ONU) associated with an ONU management module, in accordance with an example implementation of the present subject matter.

FIG. 3 illustrates a call flow for performance monitoring in an Optical Network Unit (ONU) associated with an ONU management module, in accordance with an example implementation of the present subject matter. As would be understood to a person skilled in the art, the present subject matter has been discussed with reference to a YANG protocol. However, similar principles may be applicable to other communication protocols.

At step 302 of the call flow 300, a request to enable performance in a specific ONU 108-1 may be sent to the ONU management module 210 of the OLT 104, from a NETCONF client 102. In addition to enabling the performance of an interface in an ONU 108-1, the operator may request the ONU management module 210 to selectively enable one or more performance counter groups in the ONU 108-1. It may be understood that the ONU management module 210 may be a part of another server or cloud, and the like. In one example, an operator monitoring the performance of the ONU 108-1 may make the request through the NETCONF client 102. The operator may provide details of the ONU 108-1, such as a name of the ONU 108-1, an interface where the performance is to be enabled, the one or more performance counter groups that are to be enable, and the like.

At step 304 of the call flow 300, the ONU management module 210 may send a CREATE OMCI request to the ONU 108-1, based on the performance counter groups to be enabled at the said interface, as requested by the NETCONF client 102.

At step 306 of the call flow 300, the ONU 108-1 may enable the one or more counter groups of the said interface, based on the request received from the ONU management module 210. Further, the ONU 108-1 creates a performance Managed Entity (ME) for the one or more counter groups that are enabled. When performance monitoring is enabled at an interface level, multiple Management Entities (MEs) for the one or more performance counter groups that are enabled may be created by the ONU management module 210 to collect the performance monitoring data. This is because the ONU device maps the counters to a OMCI ME based on G.988 standard.

At step 308 of the call flow 300, the ONU management module may send a GET PM ME or GET OMCI request to the ONU 108-1. In one example, the ONU management module 210 may issue a request to obtain the performance monitoring data from the MEs created in the ONU 108-1 for the corresponding one or more performance counter groups that are enabled, in the said interface.

At step 310 of the call flow 300, the ONU 108-1 may send a response to the GET OMCI request based on the performance counter groups that are enabled to the ONU management module 210, periodically. In one example, the ONU 108-1 may send the performance monitoring data periodically based on a scheduled timer set by the timing module 212, i.e., after a predetermined time interval. For example, after every 15 minutes or every twenty-four hours. In one example, the performance monitoring data that are collected by the ONU management module 210, may be stored in the memory 204.

At step 312 of the call flow 300, the NETCONF client 102 sends a get performance counter request to the OLT 104, for the selected one or more performance counter groups that are enabled in an enabled interface associated with the ONU 108-1.

At step 314 of the call flow 300, the OLT 104 sends a reply to the NETCONF client 102 in response to the get performance counter group request. The performance monitoring data may then be monitored by the operator.

As the operator can control the OMCI MEs by enabling or disabling the specific performance counter groups of interest, the operator can selectively enable the performance counter groups based on the need or a deployment scenario, thereby controlling the impact on CPU and memory usage of the ONU management module. Additionally, as the operator can disable performance counter groups that are not supported by the interface, such that performance MEs for the corresponding performance counter groups may not be created. This results in eliminating OMCI errors that may arise from the enabled interface, thereby improving the performance monitoring of the ONUs.

Figure 4:
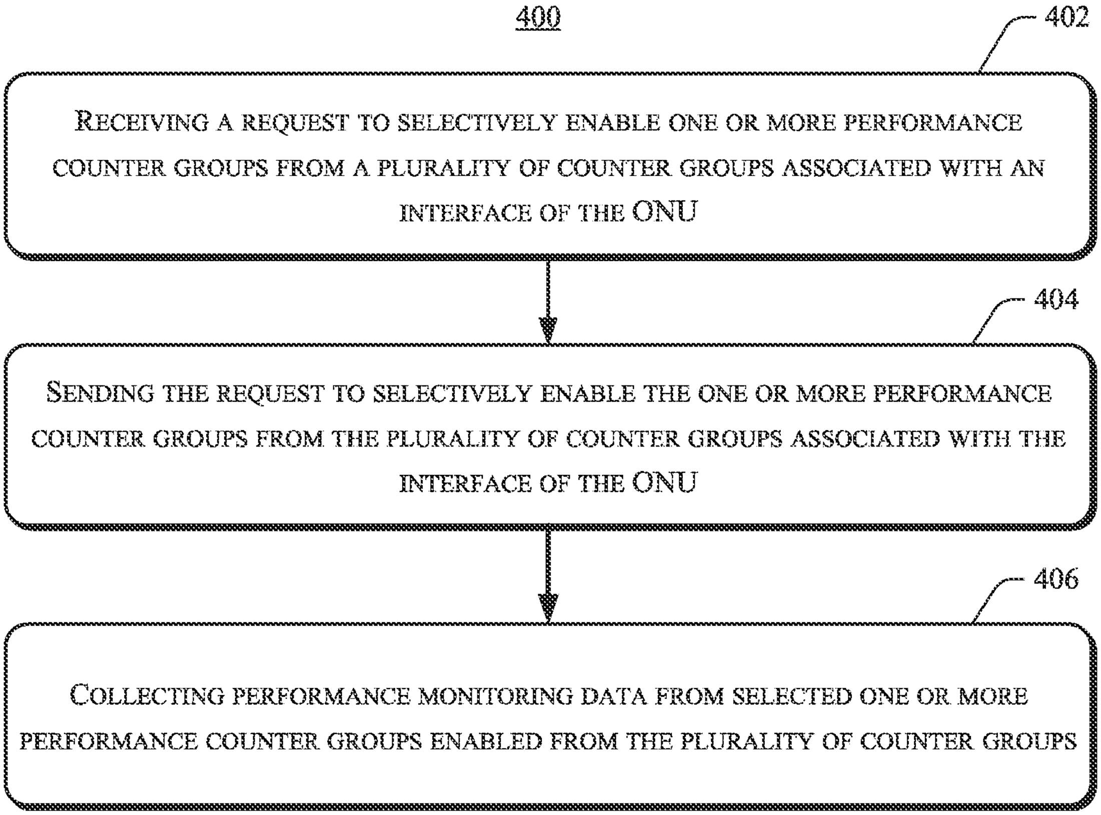
FIG. 4 illustrates a method for performance monitoring in an Optical Network Unit (ONU) associated with an ONU management module, in accordance with an example implementation of the present subject matter.

FIG. 4 illustrates a method 400 for performance monitoring in an Optical Network Unit (ONU) associated with an ONU management module, in accordance with an example implementation of the present subject matter. The order in which the method 400 is described is not intended to be construed as a limitation, and any number of the described method blocks can be combined in any order to implement method 400 or an alternative method. Additionally, individual blocks may be deleted from the method 400 without departing from the spirit and scope of the subject matter described herein. Furthermore, the method 400 may be implemented in any suitable hardware, computer readable instructions, firmware, or combination thereof. For discussion, the method 400 is described with reference to the implementations illustrated in FIGS. 1-3.

At block 402 of the method 400, a request to selectively enable one or more performance counter groups from a plurality of counter groups associated with an interface of the ONU may be received. In one example, selectively enabling the one or more performance counter groups from the plurality of counter groups associated with the interface may include any one of, but not limited to, requesting the ONU to enable one or more groups of performance counter groups from the plurality of counter groups, requesting the ONU to disable one or more groups of performance counter groups from the plurality of counter groups, or requesting the ONU to enable one or more groups of performance counter groups and disable one or more groups of performance counter groups from the plurality of counter groups, and the like. In one example, the performance counter groups may be grouped based on a state Yet Another Next Generation (YANG) tree of performance data. In one example, the request may be made by an operator monitoring the performance characteristics of interfaces associated with the ONU. In one example, the request may be made through a NETCONF client, where the NETCONF client, based on the request of the operator, generates a protocol. The protocol may be sent to the OLT which includes an ONU management module. In one example, the ONU management module may be a part of the OLT. In another example, the ONU management module may be a part of a server, or a cloud, and the like.

At block 404, on receiving the request to selectively enable the one or more performance counter groups from a plurality of counter groups associated with an interface, the ONU management module may send the request to the corresponding ONU. In one example, based on the request, an OMCI message may be generated and sent to the corresponding ONU for which performance monitoring is requested. Based on the OMCI message, the one or more performance counter groups from the plurality of counter groups associated with the interface may be enabled or disabled for the enabled interface. In one example, the ONU may create a performance monitoring managed entity PM ME based on the request received from the ONU management module, for the performance counter groups that are enabled from the plurality of counter groups associated with the enabled interface. As would be understood to a person skilled in the art, although in this example, the principle of the present subject matter has been explained with respect to a YANG protocol, similar principles may be applicable to other communication protocols.

At block 406, performance monitoring data from the selected one or more performance counter groups that are enabled from the plurality of counter groups may be collected. In one example, the performance monitoring data may be collected periodically from selected one or more performance counter groups that are enabled. In one example, the OLT may include a timing module, where the timing module may be configured to send an alert to the ONU management module after a predetermined time interval. For example, the predetermined time interval may be five minutes, or one hour, and the like. This may result in the ONU management module collecting performance monitoring data from selected one or more performance counter groups that are enabled from the plurality of counter groups periodically.

In one example, when the operator requests the performance monitoring data for the counter groups monitored, the NETCONF client sends a request to the ONU management module accordingly. Based on the request received from the NETCONF client, the ONU management module sends the data collected to the NETCONF client, which may be subsequently utilized by the user. In a scenario, where an interface associated with the ONU for which performance monitoring data have been requested, does not support a certain group of performance counters, the user may appropriately modify the request to disable the corresponding performance counter groups supported by the interface, thereby avoiding an OMCI error from the ONU to the OLT. In one example, the performance counter groups that are supported or unsupported by the ONUs may be based on a specification sheet of the corresponding ONU.

Therefore, as techniques of the present subject matter facilitate the operator to control enabling or disabling the performance counter groups based on the need or deployment scenario, the impact on CPU and memory usage in ONU management may be controlled, thereby improving the performance associated with management of the ONUs.

Although examples of the present subject matter have been described in language specific to methods and/or structural features, it is to be understood that the present subject matter is not limited to the specific methods or features described. Rather, the methods and specific features are disclosed and explained as examples of the present subject matter

We claim:

1. A method for performance monitoring in an Optical Network Unit (ONU) associated with an ONU management module, the method comprising:
- receiving a request to selectively enable one or more performance counter groups from a plurality of counter groups associated with an interface of the ONU;
- sending the request to selectively enable the one or more performance counter groups from the plurality of counter groups associated with the interface of the ONU; and
- collecting, at the ONU in response to the received request, performance monitoring data from selected one or more performance counter groups enabled from the plurality of counter groups.

2. The method as claimed in claim 1 comprises collecting the performance monitoring data periodically from selected one or more performance counter groups that are enabled.

3. The method as claimed in claim 1, wherein the performance counter groups are grouped based on a state Yet Another Next Generation (YANG) tree of performance data.

4. The method as claimed in claim 1 comprises disabling performance counter groups unsupported by the ONU based on a specification of the ONU.

5. The method as claimed in claim 1, wherein selectively enabling one or more performance counter groups from the plurality of counter groups associated with the interface comprises any one of, enabling one or more performance counter groups from the plurality of counter groups; disabling one or performance counter groups from the plurality of counter groups; and enabling one or more performance counter groups from the plurality of counter groups and disabling one or more performance counter groups from the plurality of counter groups.

6. The method as claimed in claim 1 comprises requesting the ONU to create a performance monitoring managed entity based on selected one or more performance counter groups that enabled from the plurality of counter groups associated with the interface of the ONU.

7. The method as claimed in claim 1, wherein the interface of the ONU is one of a physical interface and a logical interface.

8. The method as claimed in claim 1, wherein the interface of the ONU is one or more of an Access Network Interface (ANI), a User Network Interface (UNI), a Plain Old Telephone Service (POTS), a Gigabit-capable Passive Optic Network Encapsulation Method (GEM) port, a Physical Path Termination Point (PPTP).

9. A system comprising:
- a processor;
- a memory; and
- an optical network unit (ONU) management module communication module executable by the processor to:
  - receive a request to selectively enable one or more performance counter groups from a plurality of counter groups associated with an interface of an Optical Network Unit (ONU);
  - send the request to selectively enable the one or more performance counter groups from the plurality of counter groups associated with the interface of the ONU; and
  - collect, at the ONU in response to the received request, performance monitoring data from the selected one or more performance counter groups that are enabled from the plurality of counter groups.

10. The system as claimed in claim 9, wherein the optical network unit management module is configured to collect the performance monitoring data periodically from selected one or more performance counter groups that are enabled.

11. The system as claimed in claim 9, wherein the performance counter groups are grouped based on a state Yet Another Next Generation (YANG) tree of performance data.

12. The system as claimed in claim 9, wherein the optical network unit management module is configured to selectively enable performance counter groups unsupported by the ONU based on a specification of the ONU.

13. The system as claimed in claim 9, wherein the optical network unit management module is configured to request the ONU to create a performance monitoring managed entity based on selected one or more performance counter groups that are enabled from the plurality of counter groups associated with the interface of the ONU.

14. The system as claimed in claim 9, wherein the interface of the ONU is one of a physical interface and a logical interface.

15. The system as claimed in claim 9, wherein the interface of the ONU is one or more of an Access Network Interface (ANI), a User Network Interface (UNI), a Plain Old Telephone Service (POTS), a Gigabit-capable Passive Optic Network Encapsulation Method (GEM) port, a Physical Path Termination Point (PPTP).

* * * * *